US006584190B1

(12) United States Patent
Bressler

(10) Patent No.: US 6,584,190 B1
(45) Date of Patent: Jun. 24, 2003

(54) COMMUNICATIONS OF TELEPHONY CONTROL SIGNALING OVER DATA NETWORKS

(75) Inventor: William D. Bressler, McKinney, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/391,309

(22) Filed: Sep. 7, 1999

(51) Int. Cl.[7] .......................... H04M 7/00; H04L 12/66
(52) U.S. Cl. ................... 379/230; 379/221.08; 370/354
(58) Field of Search .............................. 379/229, 230, 379/219, 220.01, 221.08–221.12, 207.02; 370/351, 352, 354, 464

(56) References Cited

U.S. PATENT DOCUMENTS

| 5,712,903 A | * | 1/1998 | Bartholomew et al. | ..... 370/354 |
| 6,084,956 A | * | 7/2000 | Turner et al. | ................ 370/352 |
| 6,122,255 A | * | 9/2000 | Bartholomew et al. | ..... 370/237 |
| 6,278,707 B1 | * | 8/2001 | MacMillan et al. | ......... 370/352 |
| 6,324,183 B1 | * | 11/2001 | Miller et al. | ................. 370/467 |

OTHER PUBLICATIONS

Two–Ten Communications Limited, *Nortel Networks Announces SS7–IP Interworking Initiative*, p. 1 (Nov. 16, 1998).
William Bressler, *SS7 Level Two Over IP*, Internet Engineering Task Force, Internet Draft, pp. 1–6 (Jan. 1999).
*Microlegend SS7 Tutorial*, pp. 1–16, printed from web site http://www.microlegend.com, dated at least as early as Jul. 14, 1999.
Matt Holdrege, et al., *Reliable Signaling Gateway Protocol (RSGP)*, Internet Draft, pp. 1–24 (Aug. 1998).
Monling Liao, et al., *Simple SS7–TCAP/IP Protocol (STIPP)*, Internet Engineering Task Force, Internet Draft, pp. 1–18 (Mar. 1999).
Sunil Mahajan, *Packet–SS7; SS7 to PacketSS7 Network*, Version 0.1 Draft, Internet Engineering Task Force, Internet Draft, pp. 1–18 (Mar. 17, 1999).
Michael McGrew, *Transport SS7 Signaling Over IP*, Internet Draft, pp. 1–9 (Nov. 1998).
*Microlegend IP Telephony Tutorial*, pp. 1–3, printed from web site http://www.microlegend.com, dated at least as early as Jul. 2, 1999.
Fernando Cuervo, et al., *SS7–Internet Interworking—Architectural Framework*, Internet Draft, pp. 1–11 (Jul. 1998).
J. Matousek, *Bay Networks SS7—Internet Access Signaling Protocol*, Internet Engineering Task Force, Internet Draft, pp. 1–40 (Jun. 1998).
Lode Coene, *Internet and SS7 Addressing*, Internet Draft, pp. 1–11 (Jan. 1999).
G. Sidebottom, et al., *Open Architecture for IP/SS7 Interworking*, Internet Engineering Task Force, Internet Draft, pp. 1–6 (Jun. 18, 1999).
*Signaling System 7 (SS7) Tutorial*, pp. 1–32, printed from web site http://www.webproforum.com, dated at least as early as Jul. 28, 1999.
TSCNet Information Center, *FAQ's Frequently Asked Questions*, pp. 1–2, printed from web site http://www.tscnet.net, dated at least as early as Jul. 27, 1999.

* cited by examiner

Primary Examiner—Benny Q. Tieu
(74) Attorney, Agent, or Firm—Trop,Pruner&Hu,P.C.

(57) ABSTRACT

A telephony communications system includes a first type link and a second type link for communicating telephony control signaling among nodes in the system. The first type link may include a System Signaling No. 7 (SS7) link, and the second type link may include an Internet Protocol link. Interfaces to the first and second type links are provided in a layer, such as the message transfer part level two (MTP2) layer. If the layer is configured to a first mode, then the commnunication occurs through the interface to the first type link. If the layer is configured to the second mode, then the communication occurs through the interface to the second type link.

37 Claims, 6 Drawing Sheets

COMMUNICATIONS OF TELEPHONY CONTROL SIGNALING OVER DATA NETWORKS

BACKGROUND

The invention relates to communications of telephony control signaling over data networks.

Traditionally, telephone calls are switched through a public switched telephone network (PSTN), which includes switching systems, circuits to carry voice and control signaling, telephone units, and other devices. Control signaling is exchanged to establish, maintain, and terminate calls over the PSTN. Control signaling can be communicated either in-band or out-of-band. In-band signaling is carried over the same circuits that carry voice during the call session. Out-of-band signaling uses a separate network to carry the control signaling. One widely used out-of-band signaling system is the Common Channel Signaling System No. 7 (SS7), which provides a separate signaling network to carry control signaling. Out-of-band signaling allows quicker setup of a call session and enables the ability to provide additional services, such as credit-card authorization, cellular phone roaming, and other services.

An SS7 system allows signaling data (e.g., data associated with call setup, billing, authentication, and so forth) to be exchanged between telephone switches (both wireline and wireless) and other telephony elements. The SS7 architecture includes several network nodes, including service switching points (SSPs), signal transfer points (STPs), and service control points (SCPs). SSPs are switches (such as those located at central offices) that originate, terminate, or tandem calls in response to call requests from a user or a local end office. The SSPs are linked by links to STPs, which are network nodes that act as hubs for routing signaling messages. An STP may perform global title translation, a procedure by which the destination signaling point is determined from digits present in the signaling message (e.g., the dialed telephone number, calling card number, or subscriber mobile identification number). The SCPs, also coupled by links to the STPs, include databases containing circuit, routing, and customer information.

Conventionally, the links among the various signaling nodes in the SS7 network include trunks (dedicated for carrying telephony control signaling) that are implemented with T1 spans (for relatively high bandwidth switches) or analog modem connections (for relatively low traffic switches). T1 spans are high-speed digital carrier links offering up to 1.544 megabits per second transfer rates.

Increased usage of the features offered by SS7 networks has created a need for a greater number of SS7 links between network nodes to carry control signaling between the network nodes. A predetermined amount of reserve capacity is provided in each SS7 link between network nodes. As bandwidth usage encroaches into such reserve capacity, additional capacity (e.g., additional SS7 links) may be added to the link between SS7 network nodes. Thus, for example, as more subscriber units are added to an SSP, the increase in call traffic may lead to a need for more capacity in the SS7 linkset between that SSP and the STPs to which the SSP is coupled.

T1 spans, however, are relatively expensive. Thus, adding T1 spans to expand capacity can be costly, especially for smaller switching points that support a relatively small amount of traffic and thus have either a small number of T1 spans or use relatively low-speed modem connections.

A need thus exists for methods and systems that enable communications of control signaling associated with telephony calls at reduced costs.

SUMMARY

In general, according to one embodiment, a method of communicating control signaling messages in a telephony communications system having a plurality of nodes coupled by channels includes providing, in a node coupled to a channel having a first type link and a second type link, a first interface to the first type link and a second interface to the second type link. One of the first and second type links is selected to route a control signaling message to manage a call in the telephony communications system. The control signaling message is communicated over the selected link.

Some embodiments of the invention may provide one or more of the following advantages. A lower cost link may be employed for the communication of telephony control signaling. Incremental capacity may be added to an existing telephony network by using an existing data network such as the Internet. By providing two types of links for some nodes, redundancy is provided in case of link failure.

Other features and advantages will become apparent from the following description and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although reference is made to the Common Channel Signaling System No. 7 (SS7) standard for telecommunications as defined in ANSI T1.111, other standards or protocols for exchanging telephony control signaling may be used in further embodiments.

Figure 1:
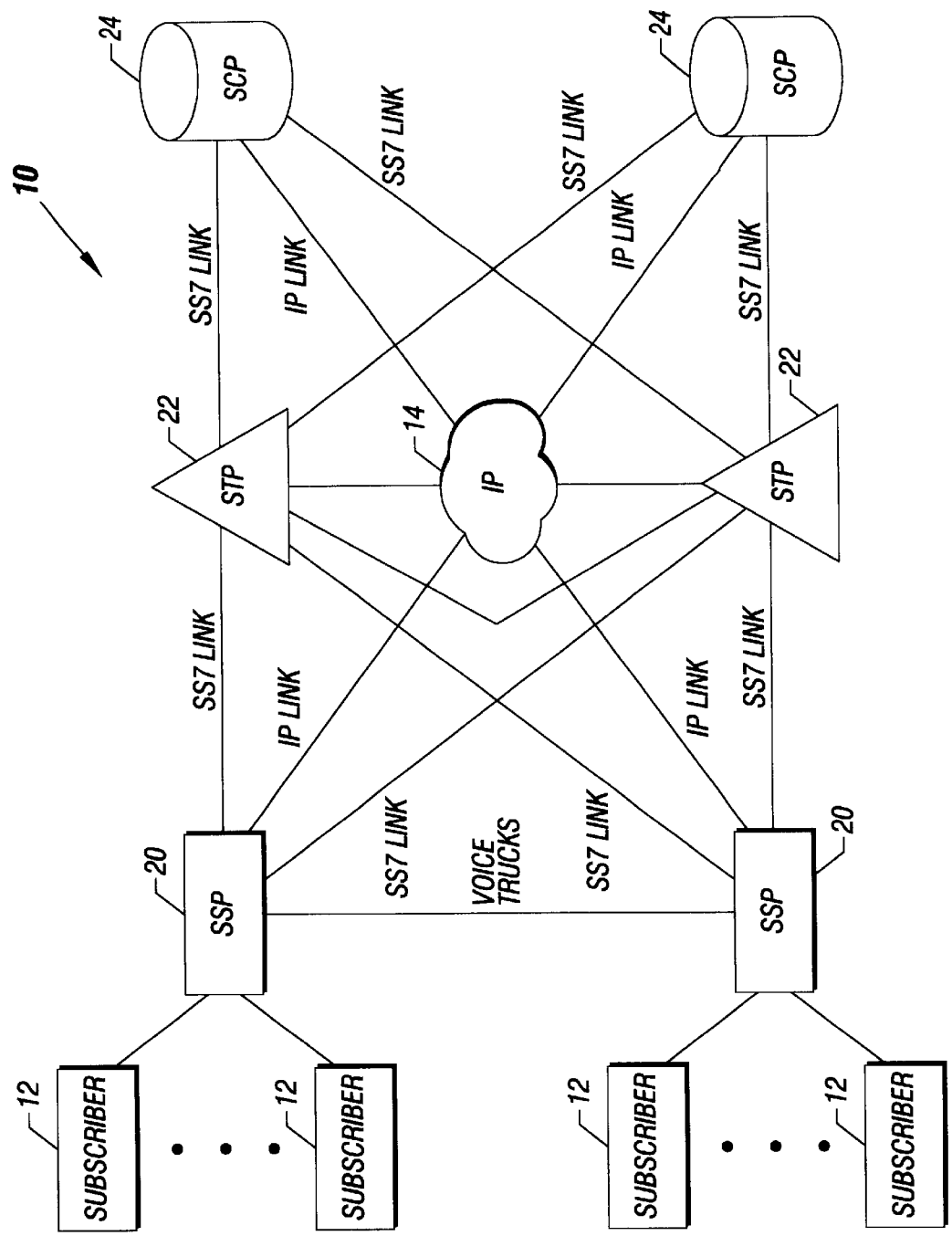
FIG. 1 is a block diagram of an embodiment of a telephony communications system.

Referring to FIG. 1, a telephony communications system 10 includes a plurality of subscriber units or terminals 12, which may be telephone units such as mobile telephones, wireline telephones, and other devices capable of establishing communications in the telephony communication system 10. As used here, "telephony communications" refers to the transmission and receipt of digitized sound (e.g., voice or other audio signals) between different points in a system using either wireline or wireless trunks. Further, "telephony control signaling" or "control signaling" refers to signals communicated to establish, maintain, and terminate calls in the telephony communications system. A "call" or "call session" refers to a communications session between an origination subscriber unit (origination terminal) and one or more destination subscriber units (destination terminals) in the telephony communications system 10.

In accordance with one embodiment, the telephony communications system 10 utilizes an SS7 network to exchange messages between network nodes to establish, maintain, and terminate telephony communications. Conventionally, SS7 messages are exchanged between network nodes over channels referred to as SS7 signaling links. According to SS7, signaling occurs out-of-band over dedicated links rather than in-band on voice channels between terminals to provide faster call setup times, more efficient use of voice circuits and channels, and support for additional services. The SS7 links between the various network nodes may include T1 spans (which are digital carrier lines) in one embodiment. Other types of lines may also be possible, such as E1 or T3 spans. An SS7 link may also be implemented with a slower connection such as that provided by an analog modem. Each SS7 linkset between any two network nodes may include one or more SS7 links.

According to some embodiments of the invention, to provide added capacity for existing SS7 links or to replace an existing SS7 link, the channel between two network nodes may also include links of a general purpose data network 14. As used here, the terms "data network" or "general purpose data network" refer to a communications network that is capable of carrying traditional data packets or files, such as electronic mail, traffic associated with Internet browsing, file transfer and access traffic, and so forth. Examples of such data networks include Internet Protocol (IP) data networks or other packet-switched networks. IP is described in Request for Comment (RFC) 791, entitled "Internet Protocol," dated September 1981. IP data networks may include private networks, such as local area networks (LANs) and wide area networks (WANs), and public networks such as the Internet. In this description, specific reference is made to use of an IP data network to communicate telephony control signaling according to one embodiment. However, it is contemplated that other types of data networks may be used in further embodiments.

A control signaling link between two nodes through the IP data network 14 is referred to as an IP link, whereas the control signaling links in accordance with SS7 between the network nodes are referred to as SS7 links. More generally, the telephony communications system 10 includes network nodes that are coupled by channels each including one of a first type link and a second type link, or both. Messages to establish, maintain, and terminate calls may be exchanged over either of the first type link and the second type link.

In the described embodiment, the first type link is an SS7 link while the second type link is an IP link. In an alternative embodiment, some channels between network nodes may include only one of the two types of links. For example, a channel between two nodes may include an IP link but not an SS7 link, and vice versa, provided that the channel provides sufficient bandwidth to communicate telephony control signaling between the coupled nodes.

If a switching node is coupled to a relatively small number of subscribers (e.g., less than a thousand), then an IP link may be used as a substitute for a SS7 link since the IP link may be capable of handling the expected control signaling traffic. This provides a cost-effective solution to users who desire services offered by SS7 or other out-of-band control signaling protocols. Furthermore, with improvements in throughput and capacity of the data network due to improvements in communications technology, IP links may be used to carry SS7 control signaling (or other telephony control signaling) for larger switching nodes.

Thus, in accordance with some embodiments, the following advantages may be provided. The IP links may be used to add incremental capacity to an existing SS7 network; or the IP links may be used as more cost-effective communications channels for SS7 control signaling instead of traditional SS7 links implemented with T1 trunks.

In accordance with SS7 in one embodiment, the network nodes in the telephony communications system 10 include service switching points (SSPs) 20, signal transfer points (STPs), and service control points (SCPs). The SSPs 20 are switching nodes coupled to respective subscriber units or terminals 12, that originate, terminate, or tandem calls. An SSP sends signaling messages to establish and release voice circuits required to complete a call. Messages sent by SSPs 20 are routed over an SS7 link or IP link through network hubs, in this case STPs 22. Each STP 22 routes an inbound message to an outbound signaling link based on routing information contained in the SS7 message. The outbound signaling link can be either an SS7 link or an IP link. Each STP 22 can route the message(s) by either using a routing table (in which case the destination point code is known) or by using global title translation, a procedure by which the destination signaling point is determined from digits present in the signaling message (e.g., the dialed telephone number, a mobile subscriber identification number, or some other dialed number). The SCPs 24 are databases that are accessible by the SSPs 20 to obtain subscriber or other information. One example is if the number is a toll-free number such as an 1-800/888 number that is not readily identifiable with a particular geographic region. In response to a query from an SSP 20, an SCP 24 sends a response to the originating SSP 20 containing the actual terminating digits associated with the 1-800/888 number.

In one embodiment, the various network nodes, including the SSPs 20, STPs 22, and SCPs 24, include interfaces to allow communications over the control signaling channels between nodes. Each node may include interfaces to both an SS7 link and an IP link or to one of the SS7 link and IP link, depending on whether the corresponding control signaling channel includes both an SS7 link and an IP link or just one of the SS7 link or IP link. In the embodiment illustrated in FIG. 1, nodes are coupled by control signaling channels including both SS7 links and IP links. Thus, the network nodes may share the control signaling load between SS7 links and IP links.

In accordance with some embodiments, SS7 messages may be transmitted over the IP links by encapsulating them in User Datagram Protocol (UDP) packets, or alternatively, Transmission Control Protocol (TCP) packets. UDP is described in RFC 768, entitled "User Datagram Protocol," dated August 1980; and TCP is described in RFC 793, entitled "Transmission Control Protocol," dated September 1981. Thus, in an originating network node (a node requesting a call), an SS7 signal unit is encapsulated into a UDP or TCP packet or datagram and transmitted over an IP link in the IP network 14. Based on the destination IP address in the UDP or TCP packet, routers in the IP network 14 routes the packet to the destination network node. In the destination network node, the incoming packet is decapsulated to retrieve the SS7 signal unit so that SS7 processing may be performed.

Thus, for example, in response to a call request from a subscriber unit 12 or local end office, an SSP 20 may generate an initial address message (IAM) to reserve an idle trunk circuit from an originating switch to a destination switch. The IAM message, which is part of an SS7 signal unit (one type being a message signal unit or MSU), is encapsulated in a UDP or TCP packet and routed over an IP link to an STP 22. The receiving STP 22 decapsulates the received signal unit message to retrieve a destination point code, a signaling link selector, a global title translation request, and other information. Based on such information, the signal unit containing the IAM is routed to the destination switch. The STP 22 may route this over an SS7 or an IP link. If routed over an IP link, the STP 22 encapsulates the signal unit in a UDP or TCP packet and routes it over the IP link to the destination SSP 20 or another STP 22 for further routing.

The destination SSP 20 decapsulates the received packet to retrieve the signal unit including the IAM. The destination SSP 20 then examines the dialed number, determines that it serves the called party and that the line to the called party is available for ringing. If so, the destination SSP 20 rings the called party line and transmits an address complete message (ACM) back to the originating SSP 20 (via one or more STPs 22) to indicate that the remote end of the trunk circuit has been reserved. The ACM is included in a signal unit that may be routed back either over IP links or SS7 links, or both. Once the called party picks up the phone, the destination SSP 20 terminates the ringing tone and transmits an answer message (ANM) to the originating switch in another signal unit message. At this point, the reserved voice trunk has been established between the SSPs 20 to allow the call from the originating subscriber 12 to the destination subscriber to proceed.

Other types of messages may be transmitted in similar fashion over either the SS7 links or the IP links. Such other messages may include messages to release the trunk circuit between two switches, query messages to SCPs 24, and other messages.

Figure 2:
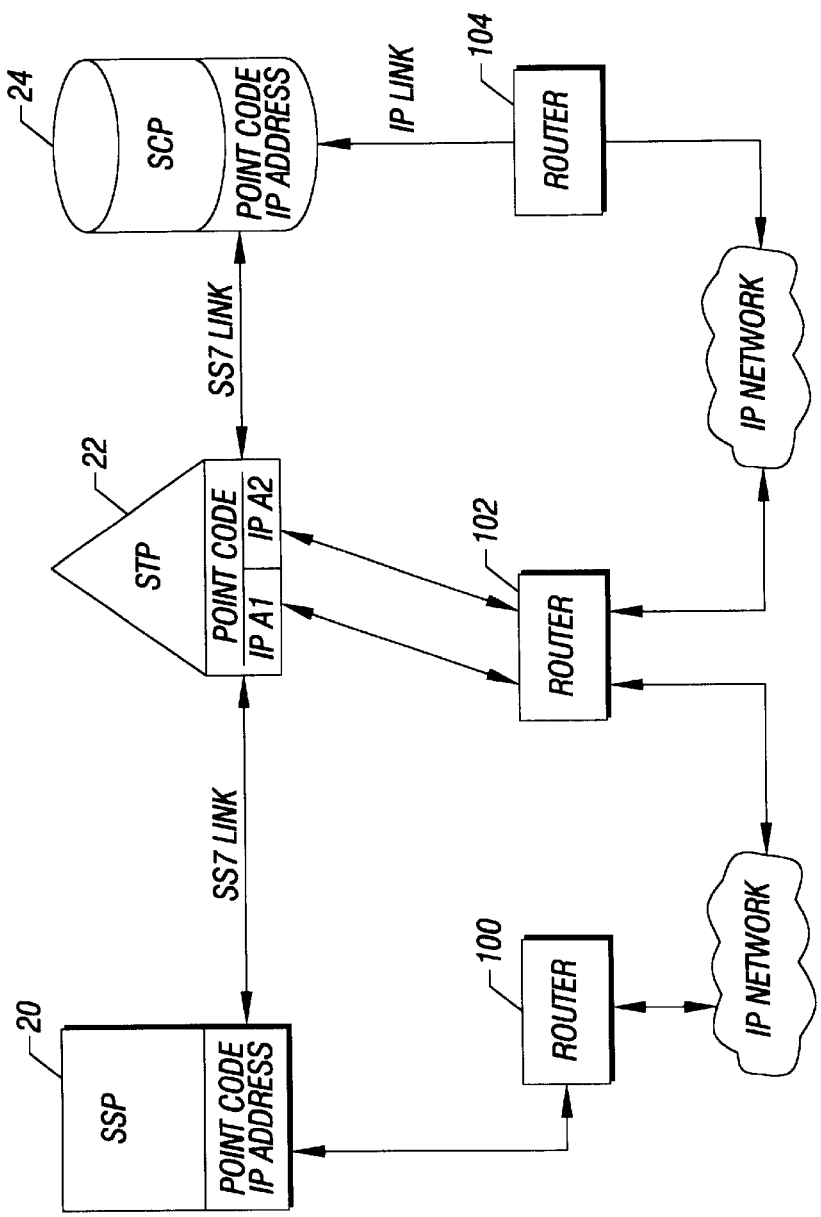
FIG. 2 illustrates network nodes in the telephony communications system that includes first type links and second type links in accordance with one embodiment, the first type links being System Signaling No. 7 (SS7) links and the second type links being Internet Protocol (IP) links.

Referring to FIG. 2, each network node (SSP 20, STP 22, or STP 24) coupled to a channel that includes both an IP link and an SS7 link is assigned a unique point code and one or more IP addresses. The point codes and IP addresses constitute identifiers to identify nodes in the control signaling network. In the illustrated arrangement, the STP 22 has two IP addresses A1 and A2, one for the link between the STP 22 and SSP 20 and the other for the link between the STP 22 and SCP 24. Numeric point codes are carried in control signaling messages exchanged between network nodes to identify the source and destination of each message. Based on the point codes, an STP 22 accesses a routing table to select the appropriate signaling path for each message. A point code is assigned using a three-level scheme that assigns a point code by network, cluster, and member. A member belongs to a cluster, and a cluster is part of a network.

Each IP address identifies an end point of the IP data network 14. Messages sent over the IP links in the IP data network 14 between or among the network nodes are routed by one or more of the routers 100, 102, and 104 to the appropriate destination point based on the IP address. Although three routers 100, 102, and 104 are illustrated, additional or less routers may exist in the IP data network 14 depending on the topology and configuration of the IP data network. Further, the number of routers also depend on the distances between two network nodes. Generally, the greater the geographic distance, the more routers are likely to be present between two network nodes.

According to some embodiments, the point code and the one or more IP addresses assigned to any given network node has no correlation to each other. Each IP address can be assigned independently of the point code associated with an SS7 network node. The point code is used to allow telephony control signaling communication over the SS7 links, while the IP address is used to allow telephony control signaling communication over IP links. More generally, two paths for telephony control signaling may be defined in each channel between two nodes, with a first address of a node used for communications over the first path and a second address of the node used for communications over the second path.

Figure 3:
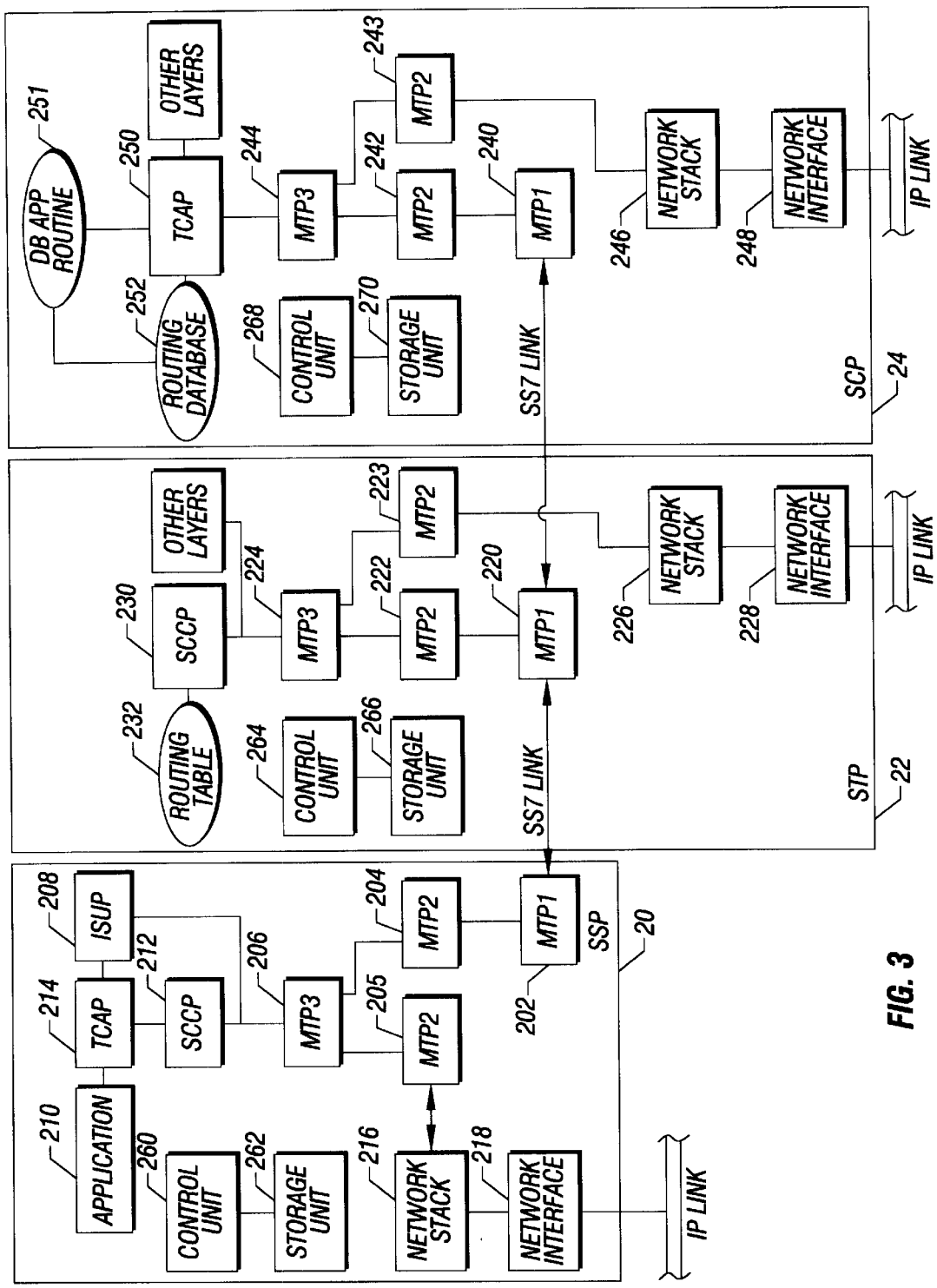
FIG. 3 is a block diagram of components of various network nodes in the telephony communications system of FIG. 1.

Referring to FIG. 3, components of the several network nodes (SSP 20, STP 22, and SCP 24) are illustrated. The SS7 protocol stack has several layers, including a message transfer part (MTP) that is divided into three levels. The lowest level, including an MTP level 1 (MTP1) layer, defines the physical, electrical, and finctional characteristics of the SS7 link. The MTP level 2 (MTP2) layer implements flow control, message sequence validation, and error checking to ensure that two end points of a signaling link can reliably exchange control signaling messages. In accordance with some embodiments, the MTP2 layer of each of the network nodes includes one or more MTP2 modules, with each MTP2 module having a first portion that is capable of communications over an SS7 link and a second portion that is capable of communications over an IP link. For the described embodiment, the first portion is referred to as the SS7 portion and the second portion is referred to as an IP portion.

In a node coupled to both an IP and an SS7 link, two MTP2 modules may be provided, one for each type of link. In another embodiment, a single MTP2 module may be capable of communicating over both types of links. If a node is coupled to a linkset having a plurality of SS7 links, then multiple MTP2 modules may be coupled to the multiple SS7 links.

The MTP level 3 (MTP3) layer provides message routing between signaling points in the SS7 network. The MTP3 layer re-routes traffic away from failed links and network nodes and congested links.

In the SSP 20, the MTP layers are the MTP1 layer 202, MTP2 layer (including MTP2 modules 204 and 205), and MTP3 layer 206. In addition to the MTP layers 202, 204, 205, and 206, the SSP 20 also includes the following SS7 protocol layers: an Integrated Services Digital Network (ISDN) user part (ISUP) layer 208, a signaling connection control part (SCCP) layer 212, a transaction capabilities applications part (TCAP) layer 214, and other layers.

The SCCP layer 212 provides connection-less as well as connection oriented network services to the MTP layers for signaling, non-signaling, and other types of information between network nodes. A network services part (NSP) is a combination of MTP and SCCP. A connection oriented service can be a permanent or temporary connection. A permanent connection can be thought of as a leased line, whereas a temporary connection (controlled by an SCCP user such as an application routine) can be thought of as a dialed temporary connection.

Temporary signaling connection includes three phases: connect, transfer, and release. For the connection phase, there are three types of addressing: signaling point code, subsystem number, and global title translation. Global title translation is used when dialed digits do not provide enough information to route a message through the signaling network. This type of message is routed to an STP 22 having global title translation capability. Permanent signaling connections are similar to temporary connections, but are used for administrative functions.

A connection-less service allows an SCCP user to transfer messages through the network without the overhead of the connection service. Under certain conditions, messages may be dropped. The SCCP user sets "Return Message on Error" to be informed of non-delivery of messages.

The ISUP layer 208 defines the messages and protocol used to establish, manage, and release trunk circuits that carry voice and data between terminating line exchanges (e.g., between a calling party and a called party). ISUP is used for both ISDN and non-ISDN calls. Calls originating and terminating at the same switch (e.g., the same SSP 20) do not use ISUP signaling.

The TCAP layer 214 supports the exchange of non-circuit related data between applications (including applications 210) across the SS7 network using the SCCP connectionless service. Queries and responses sent between SSPs 20 and SCPs 24 are carried in TCAP messages. As examples, an SSP may send a TCAP query to determine the routing number associated with a dialed 800/888 number and to check the personal identification number (PIN) of a calling card user. In mobile units, a TCAP query may carry mobile application part (MAP) messages sent between mobile switches and databases to support user authentication, equipment identification, and roaming.

In the SSP 20, the first MTP2 module 204 controls communications of control signaling over the SS7 link through the MTP1 layer 202, and the second MTP2 module 205 controls communications of control signaling over an IP link through a network stack 216 and network interface 218. The network stack 216 may be a TCP/IP or UDP/IP stack, for example. The network interface controller 218 is a hardware component that provides the interface between the network stack 216 and the physical IP link. In an alternative embodiment, one MTP2 module may be provided in the MTP2 layer to control communications over either the SS7 link or IP link. In such an alternative embodiment, the MTP2 module is capable of switching on the fly between SS7 and IP modes.

The STP 22 includes an MTP1 layer 220, an MTP2 layer (including MTP2 modules 222 and 223), and an MTP3 layer 224. The MTP2 module 222 controls communications of control signaling over the SS7 link, and the MTP2 module 223 controls communications of control signaling over an IP link through a network stack 226 and a network interface controller 228. Various layers may be located above the MTP3 layer 224, including the SCCP layer 230 and some or all of the other layers of the SS7 stack. The STP 22 can receive a message that includes a request for a global title translation. The SCCP layer 230 in the STP 22 then examines the message that determines where the message should be routed. The STP 22 can route the message to a destination SSP 20, and other STP 22 for further routing, or to an SCP 24 to obtain routing information. For example, calling card queries (used to verify that a call can be properly billed to a calling card) are routed to an SCP 24 associated with the company that issued the calling card.

The STP 22 maintains one or more routing tables 232 accessible by the SCCP layer 230 to determine how a message is to be routed. In performing global title translation, the STP 22 does not necessarily have to know the final destination of a incoming message. Instead, the STP 22 can perform intermediate global title translation, in which it uses its routing tables to find another STP further along the route to the destination SSP 20. Use of intermediate global title translation reduces the amount of routing information that each STP 22 has to store.

The SCP 24 also includes similar elements, including an MTP1 layer 240, an MTP2 layer (including MTP2 modules 242 and 243), and an MTP3 layer 244. The MTP2 module 242 controls communications of control signaling over an SS7 link, and the MTP2 module 243 controls communications of control signaling over an IP link through the network stack 246 and a network interface controller 248. Layers above the MTP3 layer 244 include a TCAP layer 250 and some or all of the other SS7 protocol layers. A database application routine 251 may also be present in the SCP 24 to manage a routing database 252. An SSP 20 or STP 22 may issue a TCAP query to the SCP 24 to determine how to route a particular message. Upon receipt of such a query, the database routine 251 in the SCP 24 accesses the routing database 252 to retrieve the routing information, which is sent back to the SSP 20 in a reply message, either over SS7 links or the IP links.

Each of the network nodes may include control units and storage units that provide processing and storage capabilities, respectively. In the illustrated embodiment, the SSP 20 includes a control unit 260 and a storage unit 262, the STP 22 includes a control unit 264 and a storage unit 266, and the SCP 24 includes a control unit 268 and storage unit 270. Each control unit may include any one of the following components: microprocessors, microcontrollers, processor cards (including one or more microprocessors or microcontrollers), computer systems, and other control or computing devices. Each storage unit may include machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; and optical media such as compact discs (CDs) or digital video discs (DVDs). Instructions that make up the various software layers in each of the network nodes, such as the MTP layers, the network stack layer and the various layers and routines above the MTP and network stack layers, may be stored in each respective storage unit. The instructions when executed by respective control units cause the network nodes to perform programmed acts.

The instructions of the software routines or modules may be loaded or transported into a system or device in one of many different ways. For example, code segments or instructions stored on floppy disks, CD or DVD media, the hard disk, or transported through a network interface card, modem, or other interface mechanism may be loaded into the system or device and executed as corresponding software routines or modules. In the loading or transport process, data signals that are embodied as carrier waves (transmitted over telephone lines, network lines, wireless links, cables, and the like) may communicate the code segments or instructions to the system or device. Such carrier waves may be in the form of electrical, optical, acoustical, electromagnetic, or other types of signals.

As discussed above, the IP links between the various network nodes may be used to replace SS7 links or to supplement the SS7 links to increase capacity without having to add additional SS7 links, which may be implemented with relatively costly T1 spans. Instead, by increasing capacity of the SS7 network with IP links, an existing IP data network infrastructure may be added to the SS7 network to handle temporary surges in traffic as well as to provide standby links in case of SS7 link failures. The number of T1 spans utilized between network nodes is based on the amount of traffic being carried between the nodes. When the average traffic load hits 40% of the total capacity offered by the existing T1 spans, more resources are added. To reduce costs, the added resource may be an IP link instead of another T1 span.

Because the IP links are part of a general purpose data link, the IP link capacity may be less than the capacity of the SS7 links since traffic is no longer routed over a reserved or dedicated resource (e.g., T1 spans) but instead is routed over a shared resource (private and public network). Thus, the IP links may be subject to a number of issues that may affect capacity, such as the number of hops between network nodes (the number of routers that traffic pass through from one node to another node), the total amount of IP data traffic, router delays, and lost traffic. However, for a network node that has a small amount of traffic, IP links may suffice as the only link for traffic transport in the SS7 network.

Figure 4:
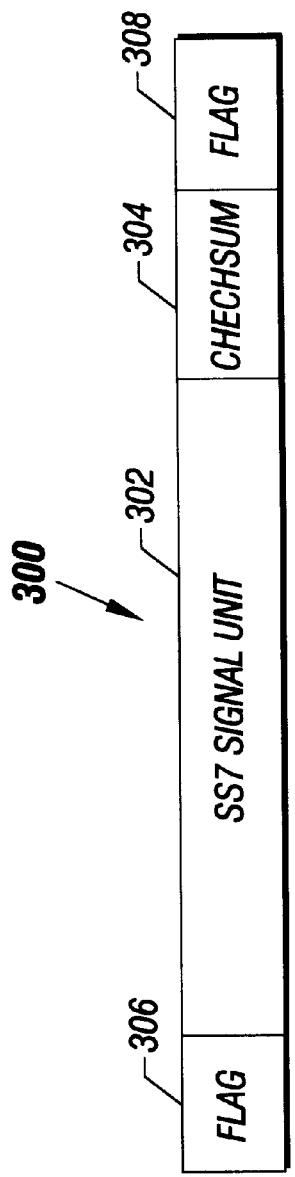
FIG. 4 illustrates a conventional signal unit message according to the SS7 protocol.

Referring to FIG. 4, a conventional SS7 signal unit message 300 according to the SS7 protocol is illustrated. The message 300 includes an SS7 signal unit 302 and a checksum field 304 that is attached to the end of the signal unit 302. The checksum 304 is used to verify that a signal unit message has passed across an SS7 link without error. Flags 306 and 308 are used to delineate the message 300. The SS7 protocol defines several types of signal units, including a fill-in signal unit (FISU), a link status signal unit (LSSU), and a message signal unit (MSU). FISU messages have no information payload (except for fields used for acknowledge and negative acknowledge purposes) and their purpose is to occupy the link at times when there are no LSSU or MSU messages being communicated. An LSSU message is used to communicate information about the status of the signaling link between the nodes on either end of the link. LSSU messages are used primarily to signal the initiation of link alignment, the quality of received signaling traffic, and the status of a processor at either end of the link. MSU messages carry all signaling associated with call setup and termination, database query and response, and SS7 network management.

Figure 5:
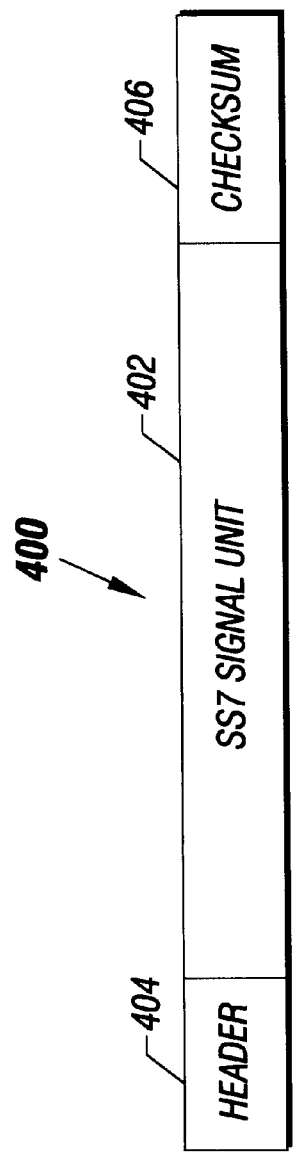
FIG. 5 illustrates an IP packet or datagram containing an SS7 signal unit in accordance with one embodiment.

Referring to FIG. 5, an IP packet or datagram 400 that includes an encapsulated SS7 signal unit 402 and checksum field 406 is illustrated. The contents of the signal unit 402 are unchanged from conventional SS7 signal units, as defined by the SS7 protocol. Unlike the signal unit message 300 that is illustrated in FIG. 4, the packet 400 does not include delineating flags. Instead, the signal unit 402 and checksum field 406 are included in the payload section of the packet 400. The packet 400 includes a header portion 404, which may be a UDP header or a TCP header, to identify the packet 400 as a UDP or TCP packet and to identify the source and destination addresses of the packet 400.

Figure 6:
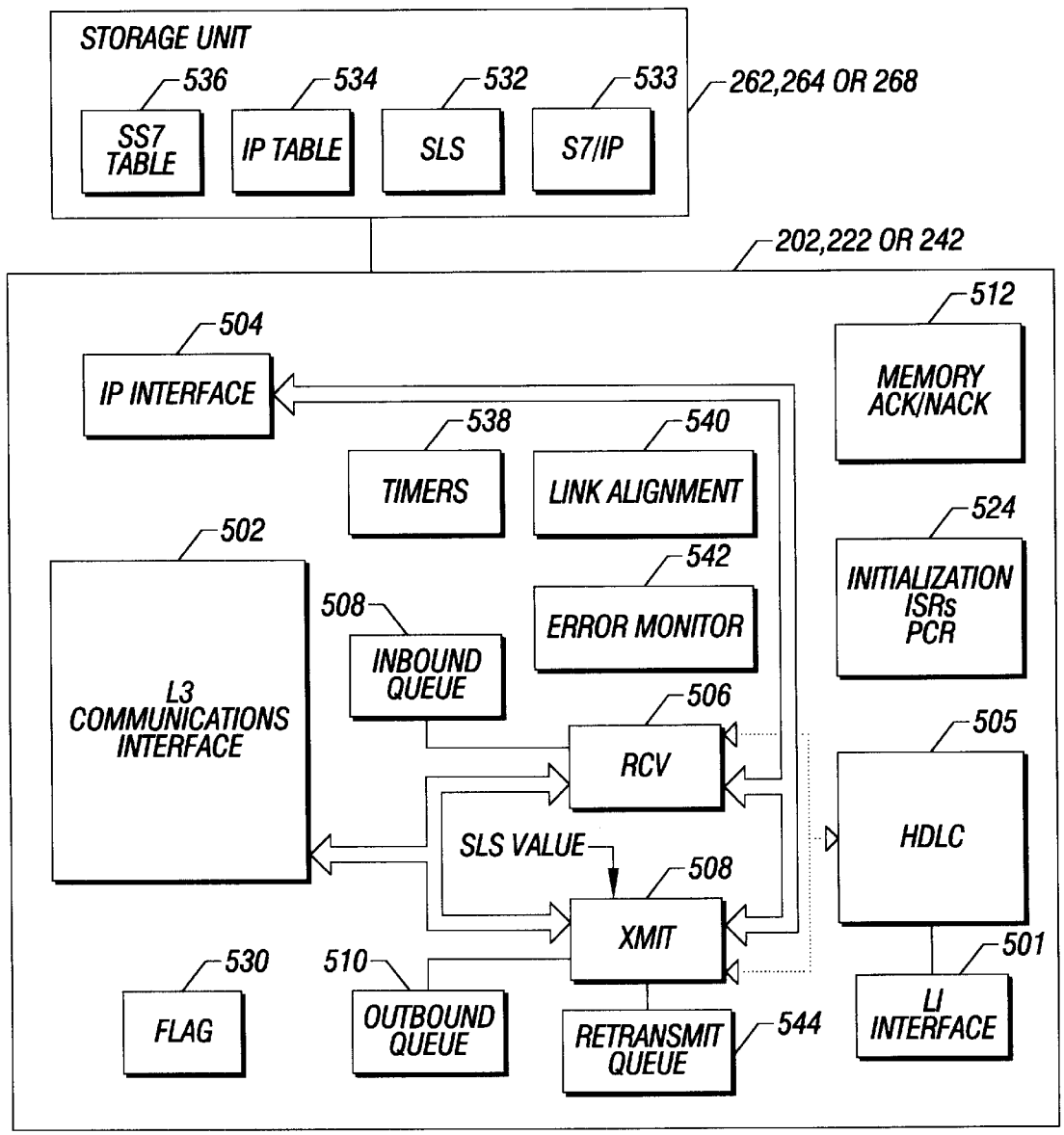
FIG. 6 illustrates a message transfer part level 2 (MTP2) layer in each of the network nodes of FIG. 3 that is adapted to communicate telephony control signaling in accordance with one embodiment.

Referring to FIG. 6, the hardware and/or software components of an MTP 2 module (204, 205, 222, 223, 242, or 243 in FIG. 3) are illustrated. The MTP2 module includes an L3 communications interface 502 to the MTP3 layer (206, 224, or 244) and an L1 interface 503 to the MTP1 layer. The MTP2 layer also includes an IP interface 504 to allow communications with the network stack (216, 226, or 246). Thus, the MTP2 module as illustrated in FIG. 6 differs from conventional MTP2 modules in that an IP interface 504 is added to the MTP2 module of FIG. 6 to support communication of control signaling messages over IP links.

A storage element 530 (e.g., register, memory bit, and so forth) accessible by the MTP2 layer stores a flag to indicate whether the MTP2 layer is in a first mode (IPLink mode) or a second mode (S7Link mode). In IPLink mode, communication of telephony control messaging occurs over an IP link through the IP interface 504. In S7Link mode, communication of telephony control messaging occurs over an SS7 link through a high-level data link control (HDLC) unit 505 and L1 interface 501 to the MTP1 layer.

In FIG. 3, the MTP2 modules 204, 222, and 242 are set in S7Link mode, whereas the MTP2 modules 205, 223, and 243 are set in IPLink mode. In an alternative embodiment, an MTP2 module may be dynamically programmable to either of the two modes during operation to route messages alternately over an IP link or an SS7 link. In such an alternative embodiment, one MTP2 module instead of two may be employed for communications of control signaling over both IP and SS7 links.

The MTP2 module also includes a receive unit 506 and a transmit unit 508 (which are implementable with software in one embodiment). The receive unit 506 is used to process inbound signal unit messages, which may be stored temporarily in an inbound queue 508. The inbound signal unit messages may be received either from an IP link or an SS7 link, depending which mode operation is in as set by the flag in element 530. A message 300 from an SS7 link is received by the L1 interface 501 from the MTP1 layer. The signal unit message 300 is passed through the HDLC unit 505, which may be implemented in hardware (e.g., a microcontroller, application-specific integrated circuit, programmable data array, and so forth). The HDLC unit 505 calculates the checksum of the received signal unit 302 and compares it to the value in the checksum field 304 of the inbound message 300. If the values match, the message is determined to be error-free and the signal unit 302 is forwarded to the inbound queue 508 for processing by the receive block 506 with the checksum field 304 stripped off.

However, if a message 400 is received from an IP link (MTP2 module in IPLink mode), then the payload of the UDP or TCP packet 400 including the signal unit 402 and the checksum 406 is received by the IP interface 504 and stored in the inbound queue 508 for processing by the receive unit 506. Since the checksum 406 is appended to the signal unit 402, the receive unit 506 (or a routine separate from the receive unit 506) has to process the checksum 406. In one embodiment, the receive unit 506 may perform the checksum calculation and verification directly in software. A table-driven algorithm may be employed to increase the efficiency and speed of the calculation.

The message may be passed with an inbound/outbound indicator to indicate whether the message is inbound or outbound (inbound messages being received from an IP link and outbound messages being destined for the IP link). If the inbound/outbound indicator indicates that the message is an inbound message, then the receive unit 506 strips off the checksum from the signal unit after verification. The receive unit 506 then forwards the signal unit to the L3 communications interface 502, which handles the signal unit as if it had been received from an SS7 link for forwarding to the MTP3 layer Outbound signal units are passed through the communications interface 502 to an outbound queue 510 for processing by the transmit unit 508. Outbound traffic may be transmitted either over an IP link or an SS7 link, depending on the value of the flag in element 530. If the output link is an SS7 link (S7Link mode), then the transmit unit 508 forwards the signal unit to the HDLC unit 505, which calculates the checksum for the signal unit. The signal unit and checksum are packaged in the SS7 signal unit message 300 and forwarded to the L1 interface 501 for communications to the SS7 link through the MTP1 layer.

If the output link is the IP link (IPLink mode), then the HDLC unit 505 may be bypassed in one embodiment. In this embodiment, the transmit unit 508 (or another routine separate from the transmit unit 508) calculates the checksum to attach to the signal unit before the signal unit and checksum are routed to the IP interface 504 for communications to the IP link through a network stack and network interface controller. Again, a table-driven algorithm may be employed to calculate the checksum to increase efficiency and throughput.

In an alternative embodiment of the IPLink mode, instead of using the transmit unit 508 or some other software routine to perform checksum calculation, the HDLC unit 505 may be used if a loopback feature is provided. With a loopback feature, the transmit block 508 forwards the signal unit 402 to the HDLC unit 505, which calculates the checksum 406 and sends the signal unit 402 and checksum 406 back to the transmit unit 508 for communications to the IP interface 504. In another embodiment, instead of using the HDLC unit 505, a co-processor may be used to calculate the checksum. The HDLC unit 505 or co-processor may similarly be used for calculating checksums for verification of inbound packets.

In a network node that is connected to both an IP link as well as an SS7 linkset (including one or more SS7 links), an MTP2 layer (including one or more MTP2 modules) may share traffic load between the SS7 and IP links. As defined by the SS7 protocol, signaling link selection (SLS) is a technique for load sharing traffic evenly over time between several links (if more than one) of an SS7 linkset. An SLS value may be selected in a round-robin fashion between a range of values (e.g., 0–15), or an application may assign a specific SLS value. The SLS technique can be extended to further provide load sharing among an IP link and the one or more lines in the SS7 link. The following table (Table 1) illustrates one example of load sharing between SS7 and IP links.

TABLE 1

| Link | SLS |
| --- | --- |
| SS7 Link | 0–14 |
| IP Link | 15 |

If the SLS value is selected to have a value from 0–14, then a line in the SS7 link corresponding to the selected value is used to route an SS7 message through the appropriate MTP2 module. If the SLS value is selected to be 15, then the SS7 message is sent over the IP link through the appropriate MTP2 module.

The following table (Table 2) illustrates an example of how the load can be shared more equally between the SS7 link and the IP link.

TABLE 2

| Link | SLS |
| --- | --- |
| SS7 Link | 0, 2, 4, 6, 8, 10, 12, 14 |
| IP Link | 1, 3, 5, 7, 9, 11, 13, 15 |

In the illustrated example of Table 2, even values of SLS will direct SS7 messages to the SS7 link, while odd values of SLS will direct messages to the IP link.

An SLS table 532 (which may be one of the tables above or another table) is stored in the storage unit (262, 264, or 268). A local copy of the SLS table 532 may be kept by the MTP3 layer. If a node is coupled to more than one SS7 linkset, then multiple SLS tables may be kept by the MTP3 layer, one for each linkset.

The current SLS may be selected based on a round-robin technique in which the SLS value is incremented with each new signal unit message to be transmitted. Alternatively, an application routine in the node requesting transmission of a signal unit message may also specifically select a value for SLS, in which case the SLS routine 550 uses that specific value. Based on the current value of SLS, the MTP3 layer routes a signal unit to a corresponding link (SS7 or IP) through a corresponding MTP2 module. In accordance with some embodiments, the layers above the MTP2 layer do not have to know about the existence of IP links. Thus, to the MTP3 layer and other layers above it, the IP link is treated as another SS7 link. By localizing control of communications over the IP link or SS7 link in the MTP2 layer, the tasks of modifying the SS7 stack to support control signaling communication over an IP or other network is simplified.

The MTP2 module also includes various routines 524, including an initialization routine, interrupt service routines (ISRs), and preventative cyclic retransmission (PCR) routines. The components of the MTP2 module may be initialized by the initialization routine to be in one of two modes, IPLink mode or S7Link mode, based on an S7IP indicator in L2 configuration information loaded into the MTP2 module during initialization. If the S7IP indicator 533 indicates an IPLink mode, then the value of the flag 530 is set at a first value. In the IPLink mode according to one embodiment, the HDLC unit 505 is disabled and HDLC dummy ISRs may be installed to handle interrupts from the HDLC unit 505 in case it has not been fully disabled. However, in the embodiment in which the HDLC is used for calculating checksums in the loopback mode, then the HDLC unit 505 is not disabled. Values of timers 538 and other elements (e.g., registers) are loaded from an IP table 534 (that is part of the L2 configuration information) in the storage unit. The values of the timers 538, defined according to the SS7 protocol, are used for various tasks, such as to determine link alignment and other tasks. For IPLink mode, the timer values may be set higher than for S7Link mode due to the possibility of greater delay on the IP link. In one embodiment, the timers 538, including T1, T2, T3, T4, T5, T6, and T7 timers may be set at their maximum values (as defined by SS7).

If the S7/IP indicator 533 in the L2 configuration information specifies S7Link mode, then the L2 initialization routine sets the flag 530 at a second value. The HDLC unit 505 is maintained enabled, and the values of the timers 538 and other elements are loaded from an SS7 table 536 (which is part of the L2 configuration information) in the storage unit.

Figure 7:
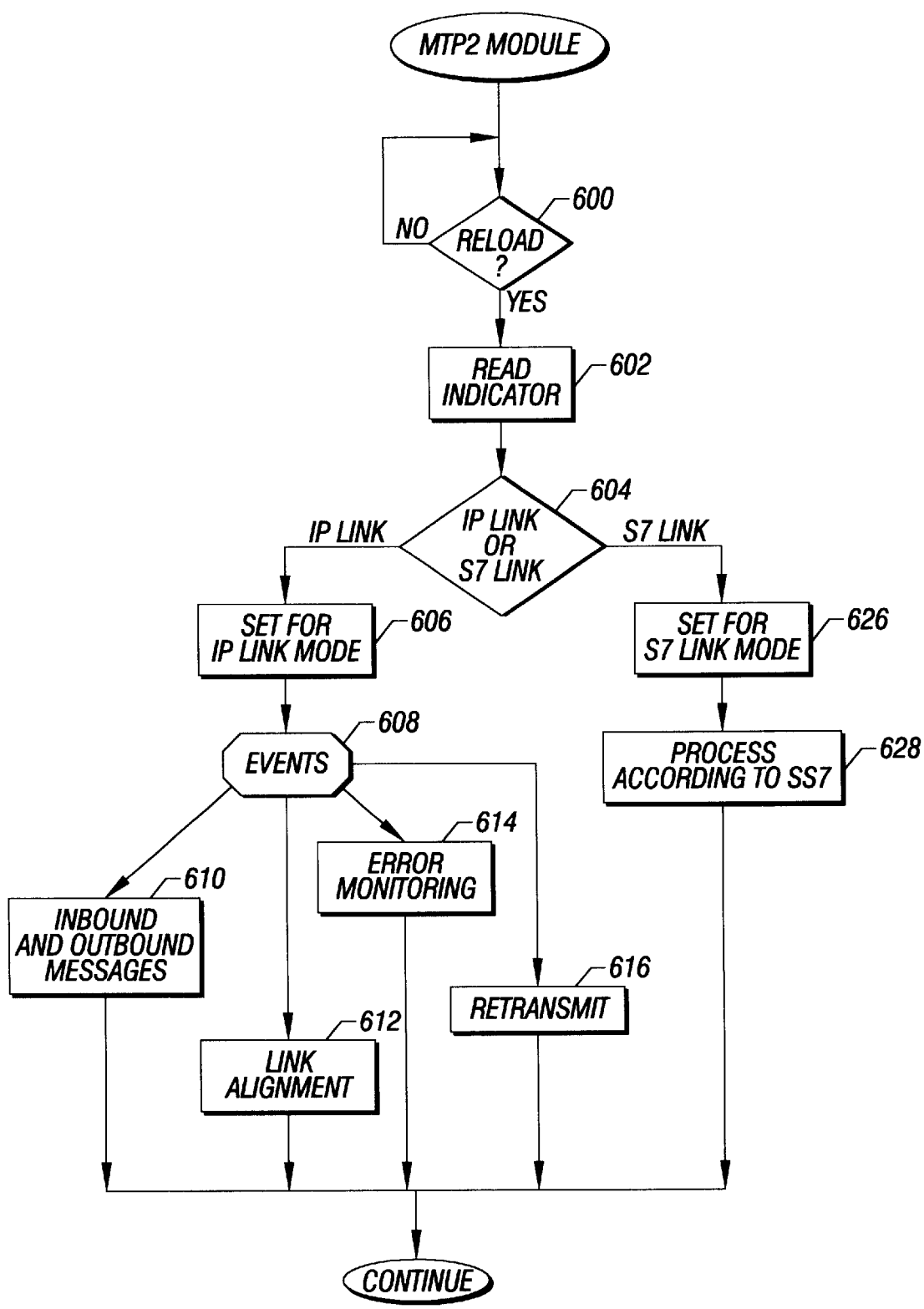
FIG. 7 is a flow diagram of tasks performed by an MTP2 layer of FIG. 6 for communicating telephony control signaling over either an SS7 link or IP link in accordance with one embodiment.

Referring to FIG. 7, the L2 initialization routine in the MTP2 module determines (at 600) if it needs to load L2 configuration information as indicated by an initialization message message. The initialization routine then reads (at 602) the S7/IP indicator 533 in the predetermined message to determine (at 604) if S7Link or IPLink mode is specified. If IPLink mode is specified, then the elements in the MTP2 module are set (at 606) for IPLink mode, as discussed above. Then in response to various events (at 608), different components of the MTP2 module perform appropriate tasks.

Outbound and inbound messages are processed (at 610) by the transmit and receive units 506 and 508. Link alignment may be performed (at 612) by a link alignment routine 540 by sending LSSU messages over the IP link periodically, e.g., every 10 milliseconds (ms).

Error monitoring may be performed (at 614) by an error monitoring routine 542 to determine if the link has failed. If no reception of a signal unit message has been received for a predetermined amount of time (e.g., 500 ms), then the IP link may be set to be out-of-service. The error monitoring routine 542 may also be employed to compare checksums of inbound messages to determine if an error in the signal unit message occurred.

If a receiving network node fails to receive an expected message, the transmitting network node may receive a negative acknowledge (NACK) that indicates a request to retransmit a message. After a signal unit message is sent, it is transferred from the outbound queue 510 into a retransmit queue 544, where the transmit unit 508 waits for an acknowledge (ACK). An ACK is indicated by use of backward sequence numbers in the signal unit messages, as defined by the SS7 protocol. ACKs and NACKs are processed by an ACK/NACK and memory management block 512. If a NACK is received, indicated by inversion of a backward indicator bit (BIB) in a signal unit message, then the IP message 400 to be retransmitted is processed (at 616) for retransmission. A forward indicator bit (FIB) in the signal unit 402 is inverted (to match the received BIB to indicate retransmission) and the transmit unit 508 recalculates the checksum 406 of the message and appends the new checksum to the signal unit 402 for retransmission in the IP packet 400.

If, instead of IPLink mode, the initialization routine determines (at 604) that S7Link mode is specified for the particular MTP2 module, the initialization routine sets (at 626) the MTP2 module components up for S7Link mode, as discussed above. Processing of further events, such as inbound and outbound signal unit messages, link alignments, error monitoring, retransmission requests, and other events are processed in accordance with conventional SS7 techniques.

Thus, a telephony communications system has been disclosed that is capable of communicating telephony control signaling, such as SS7 control signaling, over first type links (e.g., SS7 links) and/or second type links (e.g., IP links). This may be achieved by modifying the MTP2 layer without changes to the other layers in the system. Using IP links to increase capacity for communications of telephony control signaling is more cost effective than adding T1 spans. Most systems are already coupled to a public network such as the Internet, making the addition relatively simple.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of communicating control signaling messages in a telephony communications system having a plurality of nodes coupled by channels, the method comprising:

providing, in a first node coupled to a channel having a first type link and a second type link, a first interface to the first type link and a second interface to the second type link, the channel for coupling the first node and a second node;

selecting one of the first and second type links to route, to the second node, a control signaling message to manage a call in the telephony communications system;

communicating the control signaling message over the selected link to the second node; and selecting different ones of the first and second type links at different times.

2. The method of claim 1, wherein providing the first interface includes providing an interface to a common channel control signaling link.

3. The method of claim 2, wherein providing the first interface includes providing an interface to a Signaling System No. 7 link.

4. The method of claim 3, wherein providing the second interface includes providing an interface to a general purpose data network.

5. The method of claim 4, wherein providing the second interface includes providing an interface to an In ternet Protocol network.

6. The method of claim 1, wherein the communicating includes communicating a Signaling System No. 7 message.

7. The method of claim 1, wherein communicating the control signaling message over the first type link includes communicating the control signaling message in a first format.

8. The method of claim 7, wherein communicating the control signaling message over the second type link includes communicating the control signaling message in a second format.

9. The method of claim 1, further comprising receiving a service request to establish a call in the telephony communications system.

10. The method of claim 9, wherein the communicating includes communicating a control signaling message to establish a trunk circuit from an origination switch to a destination switch in the telephony communications system.

11. The method of claim 9, wherein the communicating includes communicating a query to determine how to route the call.

12. The method of claim 1, further comprising routing an incoming message based on an identifier in the incoming message.

13. The method of claim 1, further comprising performing load sharing between the first and second type links by selecting different ones of the first and second type links at different times.

14. The method of claim 1, wherein the second type link includes an Internet Protocol (IP) link, the method further comprising encapsulating the control signaling message in an IP packet if the IP link is selected.

15. A system for communicating control signaling over a telephony communications system having a first type link and a second type link, comprising:

a laver configurable to a first mode or a second mode to communicate over at least one of the first type link and the second type link; and the layer including transmit and receive components to process telephony messages, the transmit and receive components communicating telephony messages in a first format if the layer is configured to the first mode and in a second format if the layer is configured to the second mode, wherein the layer is dynamically configurable to the first and second modes to communicate telephony messages over the first and second type links at different times.

16. The system of claim 15, further comprising a checksum calculation component to calculate a checksum of each telephony message if the layer is set in the first mode.

17. The system of claim 16, further comprising a checksum routine separate from the checksum calculation component to calculate a checksum of each telephony message if the layer is set in the second mode.

18. The system of claim 15 wherein the first mode includes a System Signaling No. 7 mode.

19. The system of claim 18, wherein the second mode includes an Internet Protocol mode.

20. The system of claim 15 wherein the telephony messages are in a format according to the System Signaling No. 7 protocol if the layer is set in the first mode.

21. The system of claim 15, wherein the telephony messages are in a format according to the Internet Protocol if the layer is set in the second mode.

22. The system of claim 16, wherein the layer is adapted to communicate telephony messages with a node over the first type and second type links.

23. The system of claim 15, wherein the first type link comprises a Signaling System No. 7 (SS7) link, and the second type link comprises an Internet Protocol (IP) link, and wherein the layer is configurable to encapsulate SS7 telephony messages in IP packets for transmitting over the IP link if the layer is configured to the second mode.

24. A system for communicating control signaling over a telephony communications system having a first type link and a second type link, comprising:

a first interface coupled to the first type link;

a second interface coupled to the second type link; and a controller to process messages containing control signaling to be communicated through a selected one of the first interface and the second interface to a node coupled to the first and second type links;

wherein the controller is adapted to select the first and second type links at different times.

25. The system of claim 24, wherein the first interface includes an Internet Protocol interface.

26. The system of claim 25, wherein the second interface includes a Signaling System No. 7 interface.

27. The system of claim 26, further comprising a message transfer part level two layer including the first interface and second interface.

28. The system of claim 27, wherein the message transfer part level two layer includes at least two modules, each module including the first interface and the second interface, a first module adapted to control communications of control signaling messages over the first type link and a second module adapted to control communications of control signaling messages over the second type link.

29. The system of claim 28, wherein the first module is set in a first mode in which the first interface is active and the second module is set in a second mode in which the second interface is active.

30. The system of claim 27, wherein the controller is adapted to encapsulate SS7 telephony messages in Internet Protocol packets.

31. The system of claim 24, wherein the first and second type links provide redundancy, the controller adapted to detect failure in one of the first and second type links and to select the working one of the first and second type links to communicate control signaling.

32. The system of claim 24, wherein the controller is adapted to select the first and second type links at different times to perform load sharing between the first and second type links.

33. A system for communicating control signaling over a telephony communications system having a first type link and a second type link, comprising:

means for communicating over the first type link;

means for communicating over the second type link; and means for selecting the first and second type links to route telephony control signaling at different times to perform load balancing in communicating telephony control signaling over the first and second type links to a node.

34. A computer data signal embodied in a carrier wave comprising one or more code segments containing instructions for communicating telephony control signaling in a telephony system having a first type link and a second type link, the instructions when executed causing a device to:

configure a layer to a first mode or a second mode, the layer configured to communicate over the first type link in the first mode and the second type link in the second mode;

communicate telephony control signaling in a first format if the layer is in the first mode and in a second format if the layer is in the second mode; and configure the layer to the first and second modes at different times.

35. An article including one or more machine-readable storage media containing instructions for communicating, telephony control signaling in a telephony system having a first type link and a second tyke link, the instructions when executed causing a device to:

configure a layer to a first mode or a second mode, the layer configured to communicate over the first type link in the first mode and the second type link in the second mode;

communicate telephony control signaling in a first format if the layer is in the first mode and in a second format if the layer is in the second mode; and configure the layer to the first and second modes at different times to perform load balancing.

36. The article of claim 35, wherein the one or more machine-readable storage media contain instructions that when executed cause the device to configure the layer into an Signaling System No. 7 mode.

37. The article of claim 35, wherein the one or more machine-readable storage media contain instructions that when executed cause the device to configure the layer into an Internet Protocol mode to carry Signaling System No. 7 control signaling.

* * * * *

UNITED STATES PATENT AND TRADEMARK OFFICE
CERTIFICATE OF CORRECTION

PATENT NO. : 6,584,190 B1
DATED : January 25, 2003
INVENTOR(S) : William D. Bressler It is certified that error appears in the above-identified patent and that said Letters Patent is hereby corrected as shown below:

Column 14,
Line 23, "In ternet" should be -- Internet --;
Lines 25 and 26, "in cludes" should be -- includes --.

Signed and Sealed this

Eleventh Day of November, 2003

JAMES E. ROGAN
*Director of the United States Patent and Trademark Office*